(12) United States Patent
Nakanishi (10) Patent No.: US 10,543,732 B2
(45) Date of Patent: Jan. 28, 2020

(54) VEHICLE AIR-CONDITIONING UNIT (71) Applicant: DENSO CORPORATION, Kariya, Aichi-pref. (JP)

(72) Inventor: Masayuki Nakanishi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 152 days.

(21) Appl. No.: 15/554,162

(22) PCT Filed: Apr. 8, 2016

(86) PCT No.: PCT/JP2016/001957
§ 371 (c)(1),
(2) Date: Aug. 28, 2017

(87) PCT Pub. No.: WO2016/166957
PCT Pub. Date: Oct. 20, 2016

(65) Prior Publication Data
US 2018/0029441 A1 Feb. 1, 2018

(30) Foreign Application Priority Data
Apr. 15, 2015 (JP) ................. 2015-083575

(51) Int. Cl.
*B60H 1/00* (2006.01)
(52) U.S. Cl.
CPC ..... *B60H 1/00521* (2013.01); *B60H 1/00678* (2013.01); *B60H 1/00064* (2013.01); *B60H 2001/006* (2013.01); *B60H 2001/00092* (2013.01)

(58) Field of Classification Search
CPC ............ B60H 1/00521; B60H 1/00064; B60H 2001/00092; B60H 2001/006
USPC .......................................... 165/135; 454/906
See application file for complete search history.

(56) References Cited

U.S. PATENT DOCUMENTS

| 7,048,036 B2* | 5/2006 | Han | B60H 1/00028 165/42 |
| 2004/0194948 A1* | 10/2004 | Shibata | B60H 1/00064 165/204 |
| 2006/0000595 A1* | 1/2006 | Kang | B60H 1/00064 165/203 |
| 2006/0260783 A1* | 11/2006 | Park | B60H 1/00471 165/42 |

(Continued)

FOREIGN PATENT DOCUMENTS

| EP | 3170687 A1 * | 5/2017 | ......... B60H 1/00678 |
| JP | H05049417 U | 6/1993 | |
| JP | 2003326950 A | 11/2003 | |

(Continued)

*Primary Examiner* — Leonard R Leo
(74) *Attorney, Agent, or Firm* — Harness, Dickey & Pierce, P.L.C.

(57) ABSTRACT

A vehicle air-conditioning unit has an air conditioning case and a case interior member. The air conditioning case defines a case passage in which air flows toward a vehicle compartment. The air conditioning case has a recess defining portion that is located in the case passage and defines a recessed portion. The case interior member has a guide portion and a cover. The guide portion guides the air flowing in the case passage. The cover is located in the recessed portion. The cover prevents the air, flowing in the case passage, from flowing into the recessed portion.

10 Claims, 8 Drawing Sheets (56) References Cited

U.S. PATENT DOCUMENTS

2011/0005730 A1\* 1/2011 Habasita ............ B60H 1/00028
                                                                            165/121
2016/0263963 A1\* 9/2016 Sato ................... B60H 1/00692

FOREIGN PATENT DOCUMENTS

| | | | |
|---|---|---|---|
| JP | 2006111154 A | | 4/2006 |
| JP | 2008155735 A | | 7/2008 |
| KR | 2015025965 A | \* | 3/2015 |

\* cited by examiner

VEHICLE AIR-CONDITIONING UNIT

CROSS REFERENCE TO RELATED APPLICATIONS

This application is a U.S. National Phase Application under 35 U.S.C. 371 of International Application No. PCT/JP2016/001957 filed on Apr. 8, 2016 and published in Japanese as WO 2016/166957 A1 on Oct. 20, 2016. This application is based on and claims the benefit of priority from Japanese Patent Application No. 2015-083575 filed on Apr. 15, 2015. The entire disclosures of all of the above applications are incorporated herein by reference.

TECHNICAL FIELD

The present disclosure relates to a vehicle air-conditioning unit that blows conditioning air into a vehicle compartment.

BACKGROUND ART

As such a vehicle air-conditioning unit, an air conditioning unit included in a vehicle air-conditioning unit described in Patent Literature 1. The air conditioning unit described in Patent Literature 1 has two openings and a rotary door that opens and closes one opening of the two openings. The other opening of the two openings is not opened and closed by the rotary door and is constantly open.

The rotary door has a rotary shaft located between the two openings. The rotary door has a notch at a location adjacent to the rotary shaft and corresponding to the other opening so as not to close the other opening regardless of positions of the rotary door.

When the rotary door closes the one opening, the notch provides a recessed portion. A wind direction adjustment plate, protruding from an air conditioning case and located corresponding to the notch, covers the recessed portion such that the conditioning air does not flow round to the recessed portion. The wind direction adjustment plate is provided integrally with the air conditioning case.

According to Patent Literature 1, air flows into the other opening smoothly, thereby a turbulence flow of air is suppressed and a generation of low-frequency muffled sound (i.e., noise) can be suppressed.

PRIOR ART LITERATURES

Patent Literature

Patent Literature 1: JP 2003-326950 A

SUMMARY OF INVENTION

As described above, the wind direction adjustment plate is provided integrally with the air conditioning case according to the air conditioning unit described in Patent Literature 1. That is, the recessed portion, which may cause the turbulence flow of air, is covered with a part of the air conditioning case, and thereby the turbulence flow of air is reduced.

Figure 9:
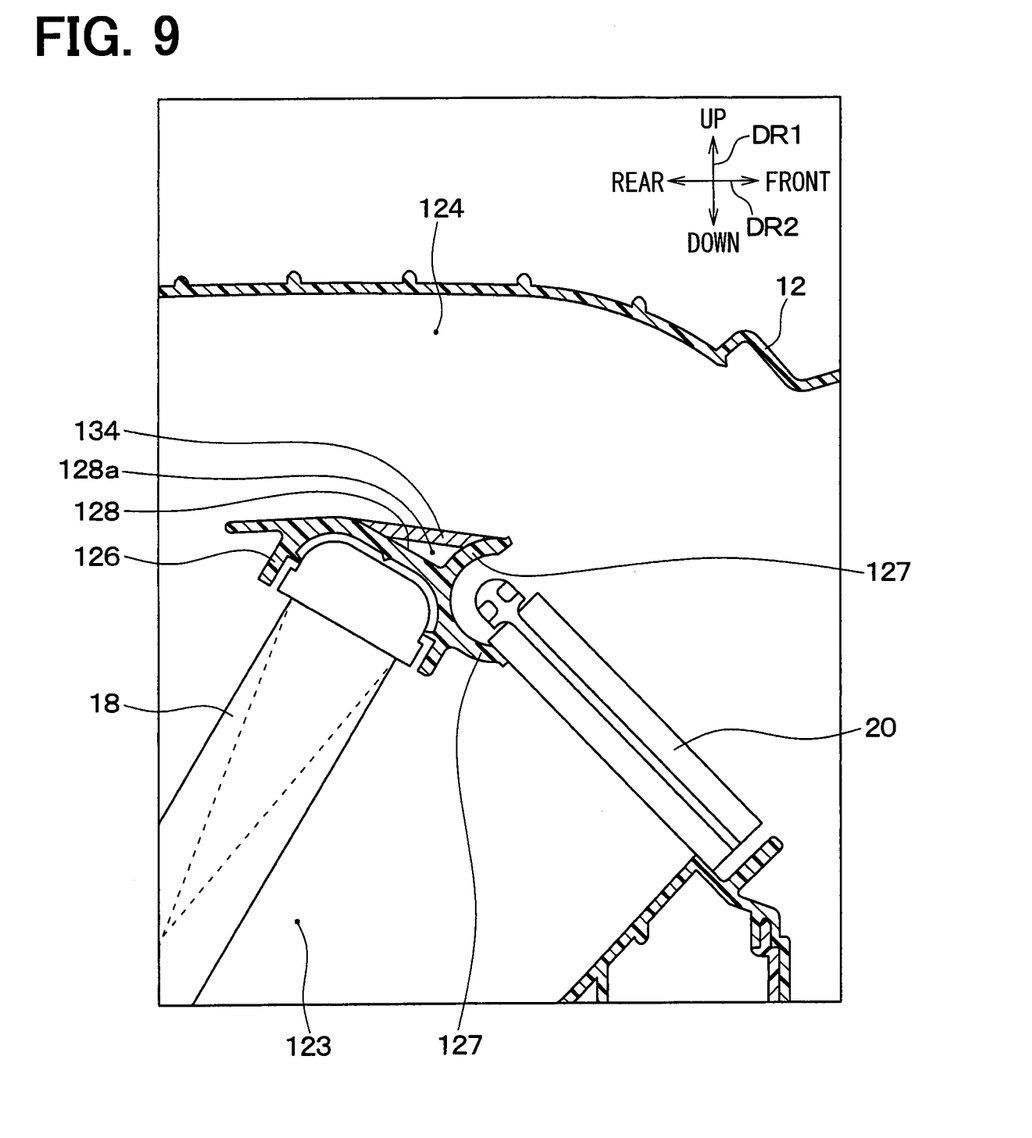
FIG. 9 is a view corresponding to the enlarged view illustrating the part IV shown in FIG. 2, according to a second comparative example.

However, according to studies conducted by the inventor of the present disclosure, the part of the air conditioning case may provide a recessed portion, which may cause the turbulence flow of air, since the air conditioning case is required to have a specified shape. In this case, it may be impossible to cover the recessed portion, which may cause the turbulence flow of air, by the part of the air conditioning case as shown in FIG. 9 described later because of a limitation regarding a mold for molding the air conditioning case. That is, the noise may not be suppressed in a manner that the part of the air conditioning case covers the recessed portion as described in Patent Literature 1.

In addition, an additional member that guides air flowing in the air conditioning case may be required to be disposed in the air conditioning case, e.g., to secure an air conditioning performance.

The present disclosure addresses the above-described issues, and it is an objective of the present disclosure to provide a vehicle air-conditioning unit that can reduce noise, which occurs due to a turbulence flow of air caused by a recessed portion provided in an air conditioning case, by using a member that guides air flowing in the air conditioning case.

A vehicle air-conditioning unit of the present disclosure has an air conditioning case and a case interior member. The air conditioning case defines a case passage in which air flows toward a vehicle compartment. The air conditioning case has a recess defining portion that is located in the case passage and defines a recessed portion. The case interior member is located in the case passage and has a guide portion and a cover. The guide portion guides the air flowing in the case passage. The cover is located in the recessed portion. The cover prevents the air, flowing in the case passage, from flowing into the recessed portion.

According to the present disclosure, the case interior member located in the case passage has the guide portion, which guides the air flowing in the case passage, and the cover, which is located in the recessed portion. The cover prevents the air, flowing in the case passage, from flowing into the recessed portion, thereby suppressing a turbulence flow of air flowing in the case passage caused by the recessed portion. Therefore, noise caused by the turbulence flow of the air can be reduced using the case interior member.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

An embodiment of the present disclosure will be described hereafter referring to drawings. A part that corresponds to or equivalents to among the embodiment and modifications may be assigned with the same reference number.

First Embodiment

Figure 1:
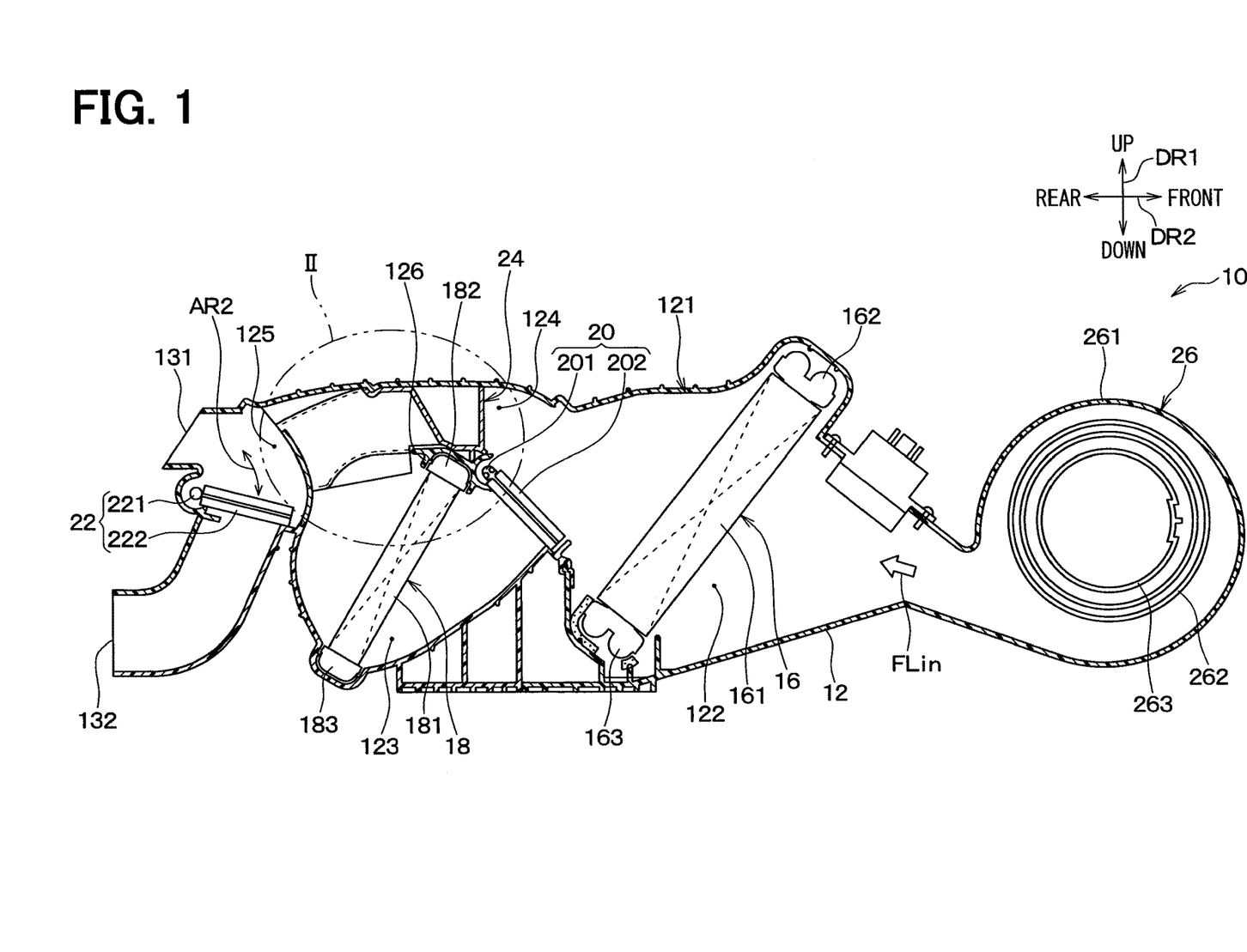
FIG. 1 is a cross-sectional view illustrating a schematic whole configuration of a vehicle air-conditioning unit according to a first embodiment.

FIG. 1 is a cross-sectional view illustrating a schematic whole configuration of a vehicle air-conditioning unit 10 according to the present embodiment. The cross-sectional view of the vehicle air-conditioning unit 10 illustrated in FIG. 1 is perpendicular to a width direction DR3 (refer to FIG. 3) of a vehicle. In FIG. 1, a double arrow showing an up-down direction DR1 and a double arrow showing a front-rear direction DR2 show directions relative to the vehicle on a condition that the vehicle air-conditioning unit 10 is mounted in the vehicle. That is, when frontward is defined a direction to which the vehicle moves, the double arrow DR1 in FIG. 1 shows the up-down direction DR1 of the vehicle, the double arrow DR2 in FIG. 1 shows the front-rear direction DR2 of the vehicle, and a double arrow DR3 shown in FIG. 3 described later shows a width direction DR3 (a left-right direction of the vehicle). The up-down direction DR1, the front-rear direction DR2, and the width direction DR3 are perpendicular to each other.

The vehicle air-conditioning unit 10 shown in FIG. 1 configures a part of a vehicle air conditioner including a compressor, a condenser, etc. located at a location in the vehicle outside a vehicle compartment. The vehicle air-conditioning unit 10 is arranged on a back side of a design panel provided in the vehicle compartment. The vehicle air-conditioning unit 10 is an air-conditioning unit performing an air conditioning for a passenger seating a backseat located on a rear side of front seats including a driver seat and a passenger seat.

As shown in FIG. 1, the vehicle air-conditioning unit 10 has an air conditioning case 12, an evaporator 16, a heater core 18, an air mix door 20, an air outlet door 22, a glide member 24, and a blower 26.

The blower 26 connects to an upstream end of the air conditioning case 12 in an air flow direction and blows air into the air conditioning case 12. The blower 26 is a centrifugal blower. The blower 26 has a blower case 261, a centrifugal fan 262, and a fan motor 263. The blower case 261 is attached to the air conditioning case 12. The centrifugal fan 262 is housed in the blower case 261 and rotates to draw and blow the air. The fan motor 263 moves the centrifugal fan 262 to rotate. The blower 26 supplies air to the evaporator 16, housed in the air conditioning case 12, as shown by an arrow FLin in conjunction with a rotation of the centrifugal fan 262.

The air conditioning case 12 is made of resin and configures an exterior of the vehicle air-conditioning unit 10 with the blower case 261. The air conditioning case 12 defines a case passage 121 therein. The air flows in the case passage 121 toward the vehicle compartment. The case passage 121 is divided into some parts by members disposed in the air conditioning case 12. That is, the case passage 121 has an upstream air passage 122, a warm air passage 123 as a first air passage, a cool air passage 124 as a second air passage, and an air mix space 125.

An upstream end of the upstream air passage 122 connects to a blowing outlet of the blower 26, and a downstream end of the upstream air passage 122 connects to the warm air passage 123 and the cool air passage 124. That is, the warm air passage 123 and the cool air passage 124 connect the downstream end of the upstream air passage 122 to be in parallel to each other. Accordingly, the cool air passage 124 serves as a bypass passage that guides air, flowing from the upstream air passage 122, to bypass the warm air passage 123. According to the present embodiment, the cool air passage 124 is located above the warm air passage 123.

The air mix space 125 connects to a downstream end of the warm air passage 123 and a downstream end of the cool air passage 124. Accordingly, air after passing through the warm air passage 123 and air after passing through the cool air passage 124 are mixed in the air mix space 125.

The evaporator 16, together with the compressor, the condenser, and an expansion valve not shown in the drawings, configures a well-known refrigeration cycle in which refrigerant circulates. The evaporator 16 cools air passing through the evaporator 16 by evaporating the refrigerant.

Specifically, the evaporator 16 is arranged in the upstream air passage 122. That is, the evaporator 16 is a cooling heat exchanger, i.e., a cooler, that cools the air flowing in the upstream air passage 122. Accordingly, the evaporator 16 cools the air flowing from the blower 26 into the upstream air passage 122 as shown in the arrow FLin. The air cooled in the evaporator 16 flows to one of the warm air passage 123 or the cool air passage 124. For example, the evaporator 16 is arranged in the upstream air passage 122 such that an entirety of the air flowing in the upstream air passage 122 passes through the evaporator 16.

The evaporator 16 has the same configuration as a well-known evaporator used for a vehicle air conditioner. Specifically, the evaporator 16 has a core 161, a first header tank 162, and a second header tank 163. The first header tank 162 and the second header tank 163 connect to opposing ends of the core 161 respectively. The evaporator 16 is arranged in the upstream air passage 122 such that the first header tank 162 is located above the second header tank 163. That is, the first header tank 162 configures an upper end of the evaporator 16, and the second header tank 163 configures a lower end of the evaporator 16.

The core 161 of the evaporator 16 has refrigerant tubes and corrugated fins. The refrigerant tubes have a flat shape in cross section and connect to the first header tank 162 and the second header tank 163. The corrugated fins have a corrugated shape and are arranged alternately with the refrigerant tubes. That is, the core 161 has a configuration in which the refrigerant tubes and the corrugated fins are stacked alternately with each other in the width direction DR3 (refer to FIG. 3).

The evaporator 16 cools air flowing through the core 161 by performing a heat exchange between refrigerant, having a low temperature and flowing in the refrigerant tubes, and the air. According to the present embodiment, the refrigerant tubes of the evaporator 16 incline to the up-down direction DR1.

The heater core 18 is located in the warm air passage 123. That is, the heater core 18 is a heating heat exchanger, i.e., a heater, that heats the air, flowing out of the evaporator 16 and flowing in the warm air passage 123, using engine cooling water that is warm water. For example, the heater core 18 is arranged in the warm air passage 123 such that an entirety of the air flowing in the warm air passage 123 passes through the heater core 18.

The heater core 18 has the same configuration as a configuration of well-known heating heat exchanger commonly used for the vehicle air conditioner. Specifically, the heater core 18 has a core 181 and a first header tank 182 and a second header tank 183. The first header tank 182 and the second header tank 183 connect to opposing ends of the core 181 respectively. The heater core 18 is positioned in the warm air passage 123 such that the first header tank 182 is located above the second header tank 183. That is, the first header tank 182 serves as an upper end of the heater core 18, and the second header tank 193 serves as a lower end of the heater core 18.

The core 181 of the heater core 18 has warm water tubes and corrugated fins. The warm water tubes have a flat shape in cross section and connect to the first header tank 182 and the second header tank 183. The corrugated fins have a corrugated shape and are arranged alternately with the warm air tubes. That is, the core 181 has a configuration in which the warm water tubes and the corrugated fins are stacked alternately with each other in the width direction DR3 (Refer to FIG. 3). Accordingly, air flowing into the core 181 is heated while passing through the core 181. According to the present embodiment, the warm water tubes of the heater core 18 incline to the up-down direction DR1.

The air conditioning case 12 has a tank supporting wall 126 therein. The tank supporting wall supports the first header tank 182 of the heater core 18. The tank supporting wall 126 is located around the first header tank 182 to surround the first header tank 182.

Figure 2:
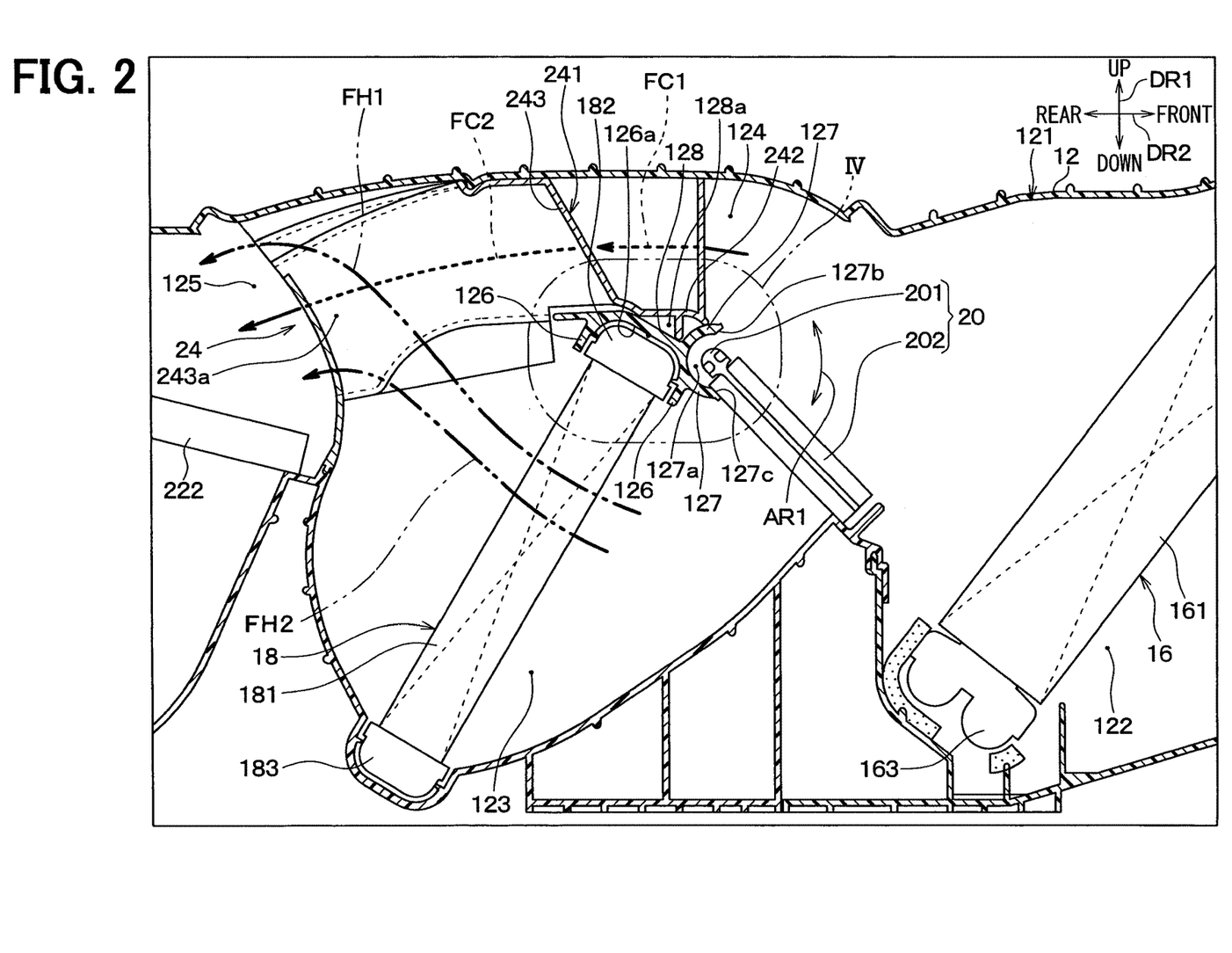
FIG. 2 is an enlarged view illustrating a part II shown in FIG. 1.

Specifically, as shown in FIG. 2, the tank supporting wall 126 has a U-shape opening to the warm air passage 123 in a cross section perpendicular to the width direction DR3. That is, the tank supporting wall 126 defines a recessed space 126a being open to the warm air passage 123. The first header tank 182 is supported by the tank supporting wall 126 by being fitted into the recessed space 126a, thereby being positioned relative to the air conditioning case 12.

The second header tank 183 of the heater core 18 is also positioned relative to the air conditioning case 12 similar to the first header tank 182. Thus, the heater core 18 is fixed to the air conditioning case 12 in a manner that both the first header tank 182 and the second header tank 183 are positioned with respect to the air conditioning case 12.

The air mix door 20 is a rotary door located in the air conditioning case 12. Specifically, the air mix door 20 is a passage door that opens and closes the warm air passage 123 and the cool air passage 124, and is rotary moved by an electric actuator (not shown). The air mix door 20 has a rotary shaft 201 and a plate door 202. The rotary shaft 201 has an axial direction that is parallel to the width direction DR3. The plate door 202 is attached to the rotary shaft 201. The air mix door 20 rotates about the rotary shaft 201 as shown by an arrow AR1, such that the plate door 202 opens or closes the upstream end of the warm air passage 123 and the upstream end of the cool air passage 124.

The air conditioning case 12 further has a rotary shaft surrounding wall 127 (i.e., a rotary shaft peripheral wall) that defines a recessed space 127a in which the rotary shaft 201 of the air mix door 20 is located. The rotary shaft surrounding wall 127 is a wall extending from the tank supporting wall 126. That is, the tank supporting wall 126 and the rotary shaft surrounding wall 127 are provided integrally with each other. Accordingly, the tank supporting wall 126 and the rotary shaft surrounding wall 127 configures a wall serving as a partition wall that partitions the warm air passage 123 and the cool air passage 124 from each other.

The rotary shaft surrounding wall 127 has an arc shape surrounding the rotary shaft 201 of the air mix door 20 in a cross section perpendicular to the rotary shaft 201. The rotary shaft surrounding wall 127 has one end 127b and an other end 127c in a circumferential direction of the rotary shaft 201. The one end 127b abuts on the air mix door 20 when the air mix door 20 is located at a maximum heating position as described later, and thereby providing one sealing surface that seals between the rotary shaft surrounding wall 127 and the air mix door 20. The other end 127c abuts on the air mix door 20 when the air mix door 20 is located at a maximum cooling position as described later, and thereby providing an other sealing surface that seals between the rotary shaft surrounding wall 127 and the air mix door 20.

The air mix door 20 rotates as shown by the arrow AR1, such that an air volume ratio between a volume of air flowing in the warm air passage 123 and a volume of air flowing in the cool air passage 124 is adjusted depending on positions of the air mix door 20. Specifically, the air mix door 20 rotates continuously between the maximum cooling position and the maximum heating position. The air mix door 20 fully closes the warm air passage 123 and fully opens the cool air passage 124 when being located at the maximum cooling position. The air mix door 20 fully opens the warm air passage 123 and fully closes the cool air passage 124 when being located at the maximum heating position. FIG. 2 illustrates the air mix door 20 located at the maximum cooling position.

The maximum cooling position of the air mix door 20 may be referred to as a MAXCOOL position as well. An entirety of air passing through the evaporator 16 flows into the cool air passage when the air mix door 20 is located at the maximum cooling position. That is, the air mix door 20 is located at the maximum cooling position when the vehicle air-conditioning unit 10 performs a maximum cooling in which a cooling performance is maximized.

The maximum heating position of the air mix door 20 may be referred to as a MAXHEAT position as well. The entirety of the air passing through the evaporator 16 flows into the warm air passage when the air mix door 20 is located at the maximum heating position. That is, the air mix door 20 is located at the maximum heating position when the vehicle air-conditioning unit 10 performs a maximum heating in which a heating performance is maximized.

When the air mix door 20 is located at an intermediate position between the maximum cooling position and the maximum heating position, the air after passing through the evaporator 16 flows to both the warm air passage 123 and the cool air passage 124 at the air volume ratio being set depending on the positions of the air mix door 20. The warm air passage 123 joins the cool air passage 124 in the air mix space 125, thereby warm air, heated in the heater core 18 after flowing through the warm air passage 123, and cool air, flowing through the cool air passage 124, are mixed in the air mix space 125 and blown into the vehicle compartment. Accordingly, the air flowing into the air conditioning case 12 as shown by the arrow FLin (refer to FIG. 1) is blown into the vehicle compartment after a temperature of the air is adjusted depending on the positions of the air mix door 20.

As shown in FIG. 2, the air conditioning case 12 has a recess defining portion 128 that is located in the case passage 121 and defines a recessed portion 128a. The recessed portion 128a is defined by the tank supporting wall 126 and the rotary shaft surrounding wall 127. Accordingly, the recess defining portion 128 overlaps with a part of the tank supporting wall 126 and a part of the rotary shaft surrounding wall 127. In other words, the recess defining portion 128 is provided integrally with the tank supporting wall 126 and the rotary shaft surrounding wall 127.

Specifically, the recessed portion 128a is open to the cool air passage 124 of the case passage 121 and extends in a direction (i.e., a recess longitudinal direction) intersecting with a flow direction of air flowing in the cool air passage 124 as shown by arrow FC1. The recess longitudinal direction is parallel to the axial direction of the rotary shaft 201 configuring the air mix door 20. For example, the recessed portion 128a has a V-shape opening to the cool air passage 124 in a cross section perpendicular to the recess longitudinal direction.

The recessed portion 128a is defined by the tank supporting wall 126 and the rotary shaft surrounding wall 127 on a side of the tank supporting wall 126 opposite to the first header tank 182. Specifically, the recessed portion 128a is defined on an opposite side of the first header tank 182 with respect to the tank supporting wall 126 and on an opposite side of the rotary shaft 201 with respect to the rotary shaft surrounding wall 127, in the cross section perpendicular to the axial direction of the rotary shaft 201 configuring the air mix door 20, i.e., in the cross-sectional view illustrated in FIG. 2.

As shown in FIG. 1, the air conditioning case 12 is provided with air outlets 131, 132 that blow conditioning air of which temperature is adjusted. Each of the air outlets 131, 132 connects to the air mix space 125, such that the conditioning air after passing through the air mix space 125 is blown into the vehicle compartment through at least one of the air outlets 131, 132.

Specifically, the air outlets 131, 132 are a face air outlet 131 and a foot air outlet 132. The face air outlet 131 blows the conditioning air toward an upper body of a passenger seated at a rear seat in the vehicle compartment. The foot air outlet 132 blows the conditioning air toward foot of the passenger seated at the rear seat.

The air outlet door 22 is a rotary door similar to the air mix door 20 and is rotated by an electric actuator (not shown). The air outlet door 22 is located upstream of the face air outlet 131 and the foot air outlet 132 in the flow direction of air. For example, the air outlet door 22 is arranged to be rotatable in the air mix space 125.

The air outlet door 22 has a rotary shaft 221 and a plate door 222. An axial direction of the rotary shaft 221 is parallel to the width direction DR3. The plate door 222 has a plate shape and attached to the rotary shaft 221. The air outlet door 22 rotates about the rotary shaft 221 as shown by arrow AR2 such that the plate door 222 opens and closes the face air outlet 131 and the foot air outlet 132.

The air outlet door 22 moves to positions that are set depending on blowing modes respectively. The blowing modes are performed selectively by the vehicle air-conditioning unit 10. For example, when the vehicle air-conditioning unit 10 performs a face mode in which the conditioning air is blown from the face air outlet 131 mainly, the air outlet door 22 is located at a face mode position to fully open the face air outlet 131 and to close the foot air outlet 132. FIG. 1 illustrates the air outlet door 22 located at the face mode position.

When the vehicle air-conditioning unit 10 performs a foot mode in which the conditioning air is blown from the foot air outlet 132 mainly, the air outlet door 22 is located at a foot mode position to close the face air outlet 131 and to fully open the foot air outlet 132. When the vehicle air-conditioning unit 10 performs a bi-level mode in which the conditioning air is blown from both the face air outlet 131 and the foot air outlet 132, the air outlet door 22 is located at an intermediate position being set between the face mode position and the foot mode position.

As described above, the warm air from the warm air passage 123 and the cool air from the cool air passage 124 join together in the air mix space 125. However, the warm air and the cool air are not mixed homogeneously, and a temperature is not even in the air mix space 125. Specifically, the temperature in the air mix space 125 decreases toward an upper side since the cool air passage 124 is located above the warm air passage 123. In the bi-level mode, there is a difference between a temperature of air flowing from the face air outlet 131 and a temperature of air flowing from the foot air outlet 132. Specifically, the temperature of air flowing from the face air outlet 131 is lower than the temperature of air flowing from the foot air outlet 132 in the bi-level mode since the face air outlet 131 is located above the foot air outlet 132. A comfortable feeling may not be given to the passenger seated at the rear seat when the difference between the temperature of air flowing from the face air outlet 131 and the temperature of air flowing from the foot air outlet 132 becomes too large. Similarly, a temperature distribution of the conditioning air should be even both in the face mode and the foot mode preferably.

Figure 3:
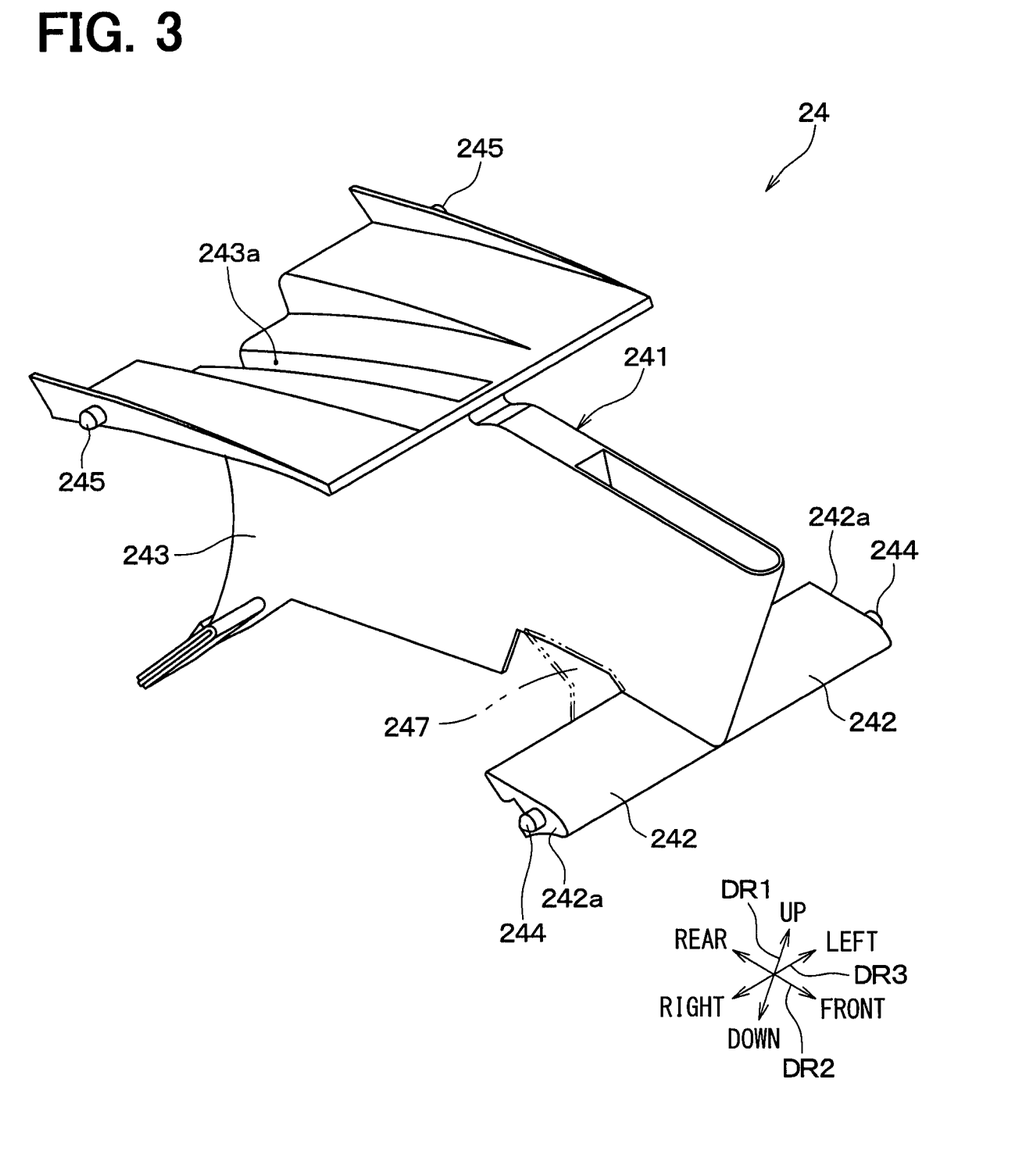
FIG. 3 is a perspective view illustrating a glide member shown in FIG. 2.

Then, the vehicle air-conditioning unit 10 of the present embodiment has the glide member 24 as shown in FIG. 2. The glide member 24 improves a mixing performance to mix the warm air from the warm air passage 123 and the cool air from the cool air passage 124. That is, the glide member 24 secures a temperature control performance to control the temperature of air blown into the vehicle compartment. The glide member 24 is arranged in the case passage 121 to across the cool air passage 124 and the air mix space 125. In other words, the glide member 24 is a case interior member (i.e., a member disposed in the case) that is disposed in the air conditioning case 12. FIG. 3 is a perspective view illustrating the glide member 24.

As shown in FIG. 2 and FIG. 3, the glide member 24 has a guide portion 241 and a cover 242. The guide portion 241 guides air flowing in the case passage 121. The cover 242 is located in the recessed portion 128a. The cover 242 is provided integrally with the guide portion 241. For example, the glide member 24 is made of resin, and the guide portion 241 and the cover 242 are molded integrally with each other.

The guide portion 241 of the glide member 24 has a tunnel defining portion 243 that defines a warm air tunnel 243a guiding the warm air from the warm air passage 123. Specifically, the tunnel defining portion 243 has a flat shape, in cross section, extending along the flow direction of air flowing in the cool air passage 124 shown by arrow FC1. The tunnel defining portion 243 is located in an intermediate area of the air mix space 125 in the width direction DR3. The warm air tunnel 243a has an upstream end and a downstream end in the flow direction of air flowing through the warm air tunnel 243a. The upstream end of the warm air tunnel 243a is open toward the downstream end of the warm air passage 123. The downstream end of the warm air tunnel 243a is open at a location adjacent to an upper end of the air mix space 125. FIG. 2 shows a shape of the glide member 24 in cross section passing through the warm air tunnel 243a.

According to the above-described arrangement of the tunnel defining portion 243, a part of the warm air, flowing from the warm air passage 123, passes through the warm air tunnel 243a as shown by arrow FH1 and flows to the location adjacent to the upper end of the air mix space 125. The cool air from the cool air passage 124 flows beside the tunnel defining portion 243 on both sides of the tunnel defining portion 243 in the width direction DR3 as shown by arrow FC1 and arrow FC2. At the same time, the rest of the warm air from the warm air passage 123, not flowing into the warm air tunnel 243a, flows beside the tunnel defining portion 243 on the both sides of the tunnel defining portion 243 in the width direction DR3 as shown by arrow FH2.

Thus, the part of the warm air, flowing from the warm air passage 123, is guided to the location adjacent to the upper end of the air mix space 125. As a result, a temperature distribution width of air in the air mix space 125 decreases while a tendency that the temperature of air in the air mix space 125 decreases toward the upper side is maintained.

The cover 242 of the glide member 24 is arranged on a side of the recessed portion 128a adjacent to the cool air passage 124 to cover the recessed portion 128a. The recessed portion 128a is not required to be covered gas-tightly. For example, a void may be defined between the recessed portion 128a and the cover 242.

The cover 242 is arranged to cover the recessed portion 128a as described above, and thereby preventing the air, flowing in the cool air passage 124, from flowing into the recessed portion 128a.

The cover 242 extends in the recess longitudinal direction since the recessed portion 128a extends in the recess longitudinal direction to have a groove shape as described above. The cover 242 has ends 242a facing each other in the recess longitudinal direction, and each end 242a is provided with a boss 244 protruding from the end 242a in the recess longitudinal direction. That is, the cover 242 has two bosses 244 protruding in opposite directions from each other.

The guide portion 241 of the glide member 24 also has bosses 245 similar to the bosses 244 of the cover 242. That is, the guide portion 241 has two bosses 245 protruding in opposite directions from each other.

The two bosses 244 of the cover 242 are located adjacent to an upstream end of the glide member 24 in the flow direction of air flowing in the case passage 121. On the other hand, the two bosses 245 of the guide portion 241 are located adjacent to a downstream end of the glide member 24 in the flow direction of air flowing in the case passage 121.

Fitting holes (not shown) are open in an inner wall surface of the air conditioning case 12 at locations corresponding to the bosses 244 and the bosses 245 respectively. The bosses 244 and the bosses 245 are fitting portions that are attached to the air conditioning case 12 by being fitted into the fitting holes of the air conditioning case 12 respectively. Accordingly, the glide member 24 is fixed in the air conditioning case 12. That is, the bosses 244 and the bosses 245 of the glide member 24 serve as position setting portions that set a position of the glide member 24 relative to the air conditioning case 12.

As described above, as shown in FIG. 2, the glide member 24 of the present embodiment disposed in the air conditioning case 12 has the guide portion 241 guiding the air flowing in the case passage 121 and the cover 242 located in the recessed portion 128a inside the air conditioning case 12. The cover 242 of the glide member 24 is arranged to cover the recessed portion 128a, and thereby preventing the air, flowing in the cool air passage 124, from flowing into the recessed portion 128a.

Figure 4:
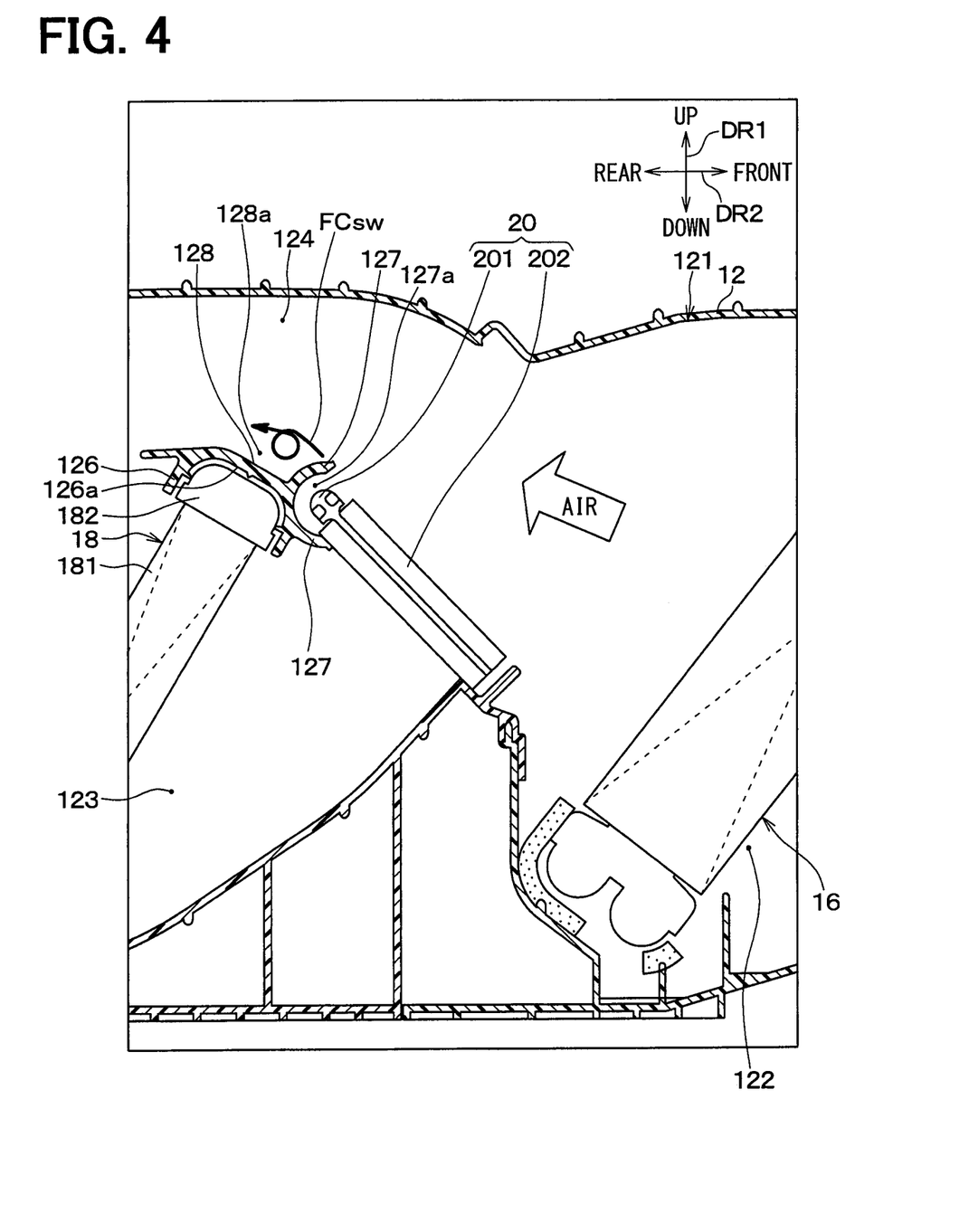
FIG. 4 is an enlarged view illustrating a part IV shown in FIG. 2.

In contrast, in a case that the glide member 24 does not have the cover 242 and the recessed portion 128a is kept open toward the cool air passage 124, an airflow flowing in the cool air passage 124 separates from the rotary shaft surrounding wall 127 as shown in FIG. 4. As a result, a turbulent flow is caused in the recessed portion 128a as shown by arrow FCsw.

That is, the cover 242 of the glide member 24 can suppress a turbulence flow caused in the airflow flowing in the cool air passage 124 due to the recessed portion 128a. Therefore, according to the vehicle air-conditioning unit 10, a noise due to the turbulence flow caused by the recessed portion 128a can be reduced using the glide member 24. FIG. 4 is an enlarged view illustrating the portion IV shown in FIG. 2 and shows the airflow along the recessed portion 128a when considering the glide member 24 does not have the cover 242.

Here, the cool air passage 124 has the recessed portion 128a however does not have a member corresponding to the heater core 18 that provides a flow resistance of air, as compared to the warm air passage 123. That is, air flows through the cool air passage 124 easily, thereby the cool air passage 124 causes noise easily as compared to the warm air passage 123. Then, the cover 242 of the glide member 24 covers the recessed portion 128a that may be a sound source causing the noise when being open to the cool air passage 124. As a result, the cover 242 can reduce the noise effectively.

The effect reducing the noise in a manner that the cover 242 of the glide member 24 suppresses the turbulence flow is shown in simulation results shown in FIG. 5 through FIG. 8. The simulation results are obtained from simulations conducted under a condition that a fixed volume of air is blown while the vehicle air-conditioning unit 10 is operated in the face mode and in the maximum cooling.

Figure 5:
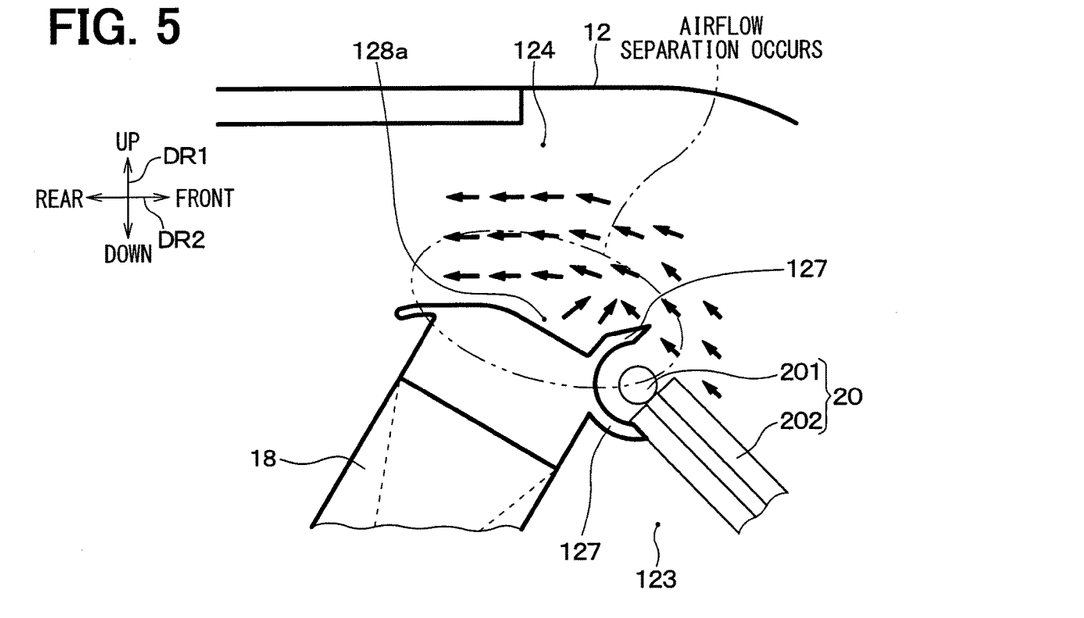
FIG. 5 is a diagram illustrating a simulation result of airflows according to a first comparative example.
Figure 7:
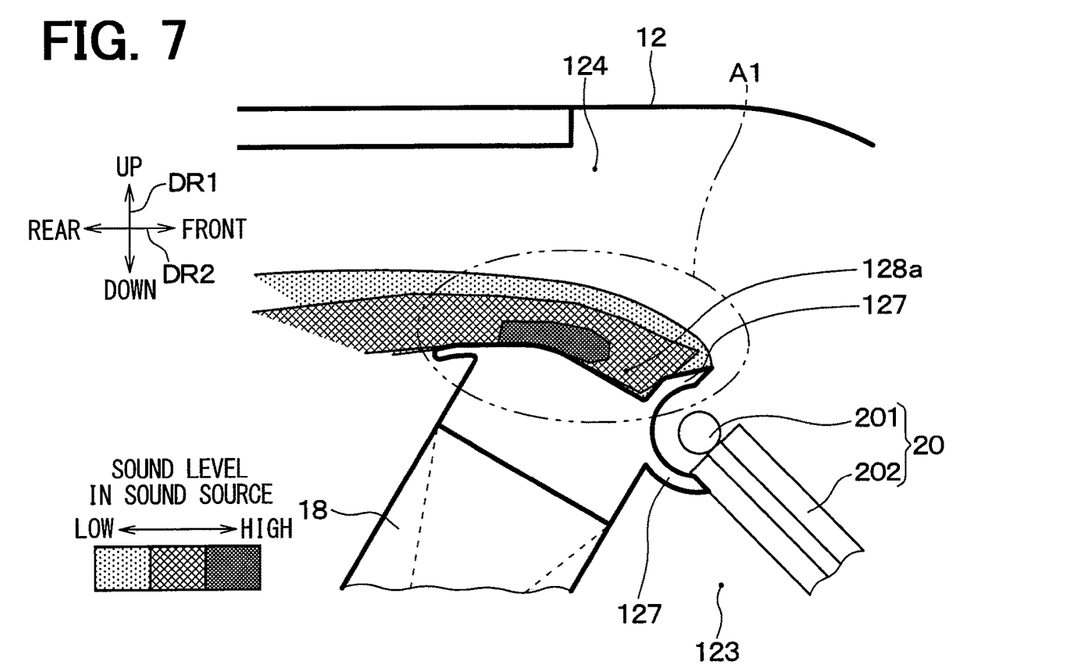
FIG. 7 is a distribution map illustrating a simulation result of sound level of a noise caused by air according to the first comparative example.

FIG. 5 and FIG. 7 are diagrams showing the simulation results of a first comparative example in which the glide member 24 does not have the cover 242 and the recessed portion 128a is kept open to the cool air passage 124. In FIG. 5, flow directions (i.e., wind directions) of air flowing around the recessed portion 128a in the cool air passage 124 are shown by arrows. FIG. 7 is a distribution chart showing sound levels of the noise caused around the recessed portion 128a in the cool air passage 124.

Figure 6:
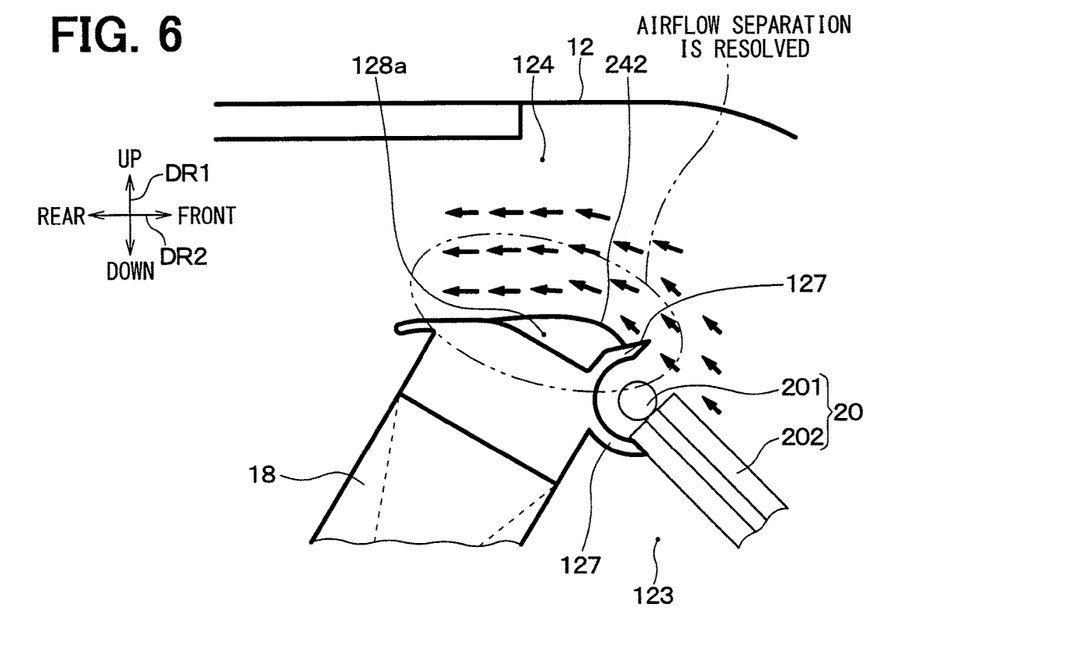
FIG. 6 is a diagram illustrating a simulation result of airflows according to the first embodiment.
Figure 8:
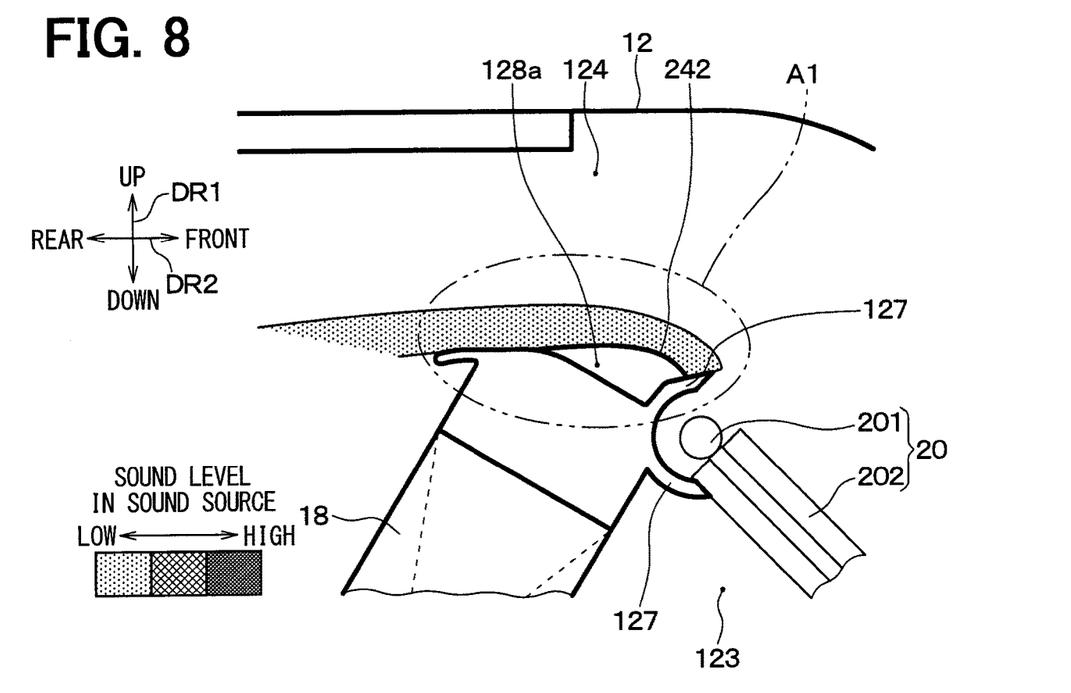
FIG. 8 is a distribution map illustrating a simulation result of sound level of a noise caused by air according to the first embodiment.

FIG. 6 and FIG. 8 are diagrams showing the simulation results of the present embodiment. In FIG. 6, flow directions (i.e., wind directions) of air flowing around the recessed portion 128a in the cool air passage 124 are shown by arrows. FIG. 8 is a distribution chart showing sound levels of the noise caused around the recessed portion 128a in the cool air passage 124. Each of FIG. 5 to FIG. 8 is an enlarged view illustrating the portion IV shown in FIG. 2.

The airflows flowing along the recessed portion 128a separate from the rotary shaft surrounding wall 127 due to the recessed portion 128a as shown in FIG. 5 according to the first comparative example. As a result, the turbulence flow is caused in the recessed portion 128a and around the recessed portion 128a inside the cool air passage 124. On the other hand, according to the present embodiment, the above-described separation of air shown in FIG. 5 is suppressed as shown in FIG. 6 since the cover 242 of the glide member 24 covers the recessed portion 128a.

When it comes to the sound levels around the recessed portion 128a, the sound levels in the recessed portion 128a and round the recessed portion 128a are high as shown in FIG. 7. Specifically, the maximum sound level in an area A1 is 48 dB. On the other hand, according to the present embodiment, the sound levels in the recessed portion 128a and around the recessed portion 128a shown in FIG. 8 are lower than those of the first comparative example (shown in FIG. 7). Specifically, the maximum sound level in the area A1 is 16 dB according to the present embodiment. That is, the sound levels according to the present embodiment are decreased dramatically as compared to the first comparative example.

As shown in the simulation results, occurrence of the turbulence flow can be suppressed and the sound levels can be decreased in the recessed portion 128a and around the recessed portion 128a inside the air conditioning case 12, according to the vehicle air-conditioning unit 10 of the present embodiment.

A second comparative example will be described hereafter to explain effects of the present embodiment. FIG. 9 is a diagram according to the second comparative example to explain the effects of the present embodiment, and corresponds to the enlarged view illustrating the portion IV shown in FIG. 2. According to the second comparative example, as shown in FIG. 9, a sealing wall 134 sealing the recessed portion 128a is attached to the tank supporting wall 126 and the rotary shaft surrounding wall 127 integrally with each other in the air conditioning case 12.

However, when molding the recessed portion 128a surrounded by the tank supporting wall 126, the rotary shaft surrounding wall 127, and the sealing wall 134 by a molding die, the molding die has an elongated shape extending in the recess longitudinal direction, according to the second comparative example.

Since the molding die has the elongated shape corresponding to the recessed portion 128a, the molding die is broken easily. Accordingly, durability of the molding die may deteriorate.

On the other hand, according to the present embodiment, the molding die is not necessary to have the elongated shape corresponding to the recessed portion 128a, thereby the deterioration of the durability of the molding die can be suppressed.

Figure 10:
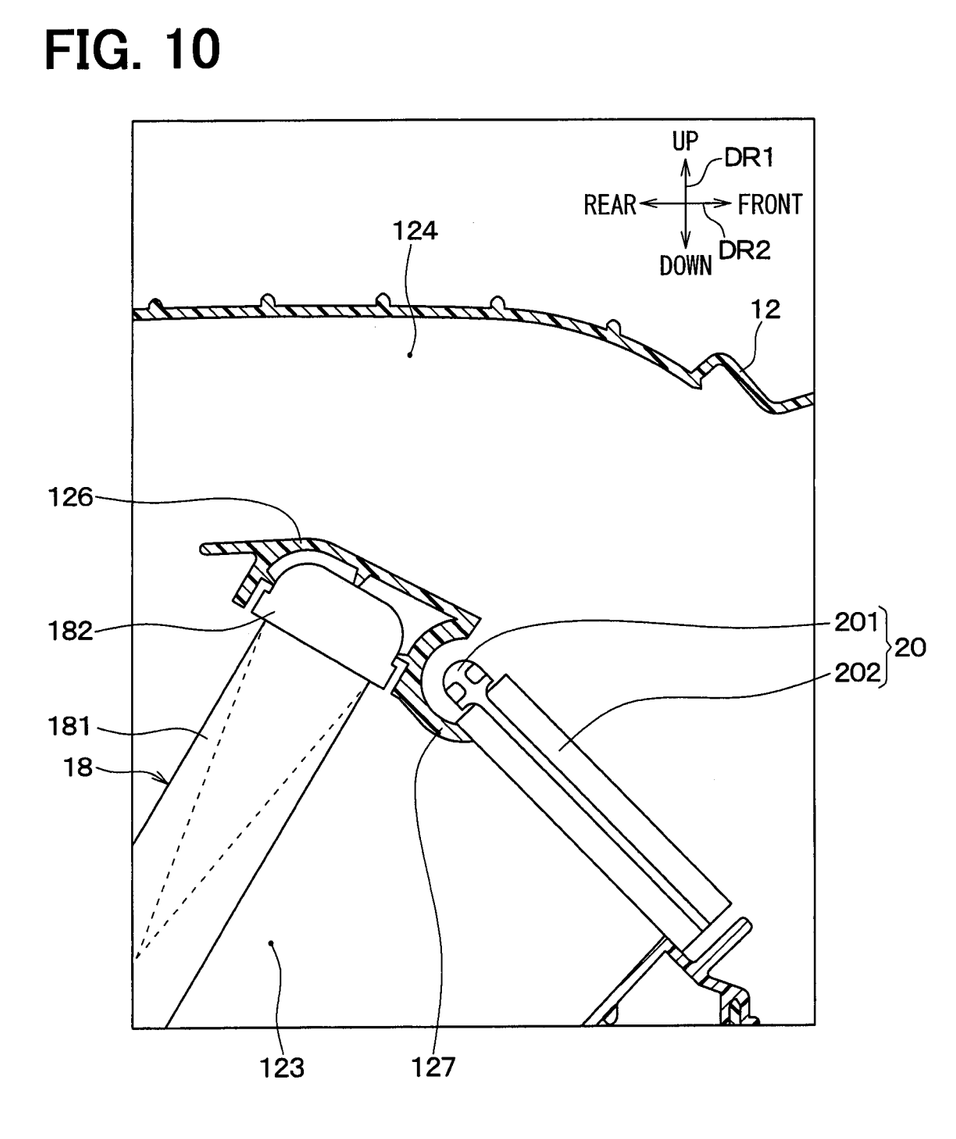
FIG. 10 is a view corresponding to the enlarged view illustrating the part IV shown in FIG. 2, according to a third comparative example.

A third comparative example will be described hereafter to further explain other effects of the present embodiment. FIG. 10 is a diagram according to the third comparative example to explain the effects of the present embodiment and corresponds to the enlarged view illustrating the portion IV shown in FIG. 2. According to the third comparative example, as shown in FIG. 10, the heater core 18 and the tank supporting wall 126 are arranged as the same as the present embodiment, however the position of the air mix door 20 is lowered as compared to the present embodiment. The position of the rotary shaft surrounding wall 127 is also lowered to correspond to the air mix door 20. Accordingly, the recessed portion 128a is not defined, and the tank supporting wall 126 and the rotary shaft surrounding wall 127 have no recessed portion and no protruding portion on the side adjacent to the cool air passage 124.

According to the third comparative example, the noise can be reduced considerably. However, the noise is reduced only in a case that the position of the rotary shaft 201 of the air mix door 20 can be lowered. For example, the case that the position of the rotary shaft 201 can be lowered is estimated as that an enough space to enlarge an exterior size of the air conditioning case 12 toward a lower side for the rotary shaft 201 can be secured such that the plate door 202 of the air mix door 20 can be disposed without changing a size of the plate door 202 even in a restricted environment of the air conditioning case 12 being mounted in the vehicle. For another example, the case is estimated as that a heating capacity and a volume of air passing through the warm air passage 123, e.g., a volume of air in the foot mode, can be secured certainly even when the size of the plate door 202 is decreased for the rotary shaft 201.

However, in other cases other than the above-described cases, it may be difficult to arrange the air mix door 20 as shown in FIG. 10 in the restricted environment. Then, the present embodiment is effective especially in a case where the air mix door 20 cannot be arranged as shown in FIG. 10 due to the restricted environment and there is no choice not to have the recessed portion 128a (refer to FIG. 2).

In addition, the cover 242 of the glide member 24 is provided integrally with the guide portion 241 as shown in FIG. 3 according to the present embodiment. As a result, the cover 242 is attached to the air conditioning case 12 by attaching the glide member 24 to the air conditioning case 12, thereby an increase of manufacturing hours can be suppressed.

Furthermore, according to the present embodiment, the cover 242 of the glide member 24 has the ends 242a that are provided with the bosses 244 respectively, and the bosses 244 set the position of the glide member 24 relative to the air conditioning case 12. Accordingly, the cover 242 can have both a function setting the position of the glide member 24 and a function reducing the noise. As a result, a size of the glide member 24 can be reduced easily as compared to a case, for example, where a function setting the position of the glide member 24 is required to be provided separately from the cover 242.

Moreover, according to the present embodiment, there is no necessity to prepare a member reducing the noise separately from the glide member 24 since the guide portion 241 and the cover 242 of the glide member 24 are molded integrally with each other. As a result, an increase of a quantity of components configuring the vehicle air-conditioning unit 10 can be suppressed.

Modifications (1) According to the above-described embodiment, the cover 242 of the glide member 24 covers the recessed portion 128a, e.g., almost fills the recessed portion 128a on a condition shown in FIG. 2. However, the cover 242 may cover the recessed portion 128a to reduce a depth of the recessed portion 128a.

(2) According to the above-described embodiment, the cover 242 of the glide member 24 protrudes from the tunnel defining portion 243 in the width direction DR3 on both sides of the tunnel defining portion 243 in the width direction DR3 as shown in FIG. 3. However, a reinforcement rib 247 having a triangle shape may be provided as shown by a two-dot line in FIG. 3 to secure strength of the cover 242. In a case shown in FIG. 3, the reinforcement rib 247 is provided in a junction part in which the cover 242 and the tunnel defining portion 243 connect to each other. A quantity of the reinforcement rib 247 may be two, and the two reinforcement ribs 247 are provided on both sides of the tunnel defining portion 243 in the width direction DR3 respectively.

(3) According to the above-described embodiment, the vehicle air-conditioning unit 10 shown in FIG. 1 is an air conditioning unit for a rear seat, however not being limited to be used for the rear seat and may be arranged anywhere in the vehicle. For example, the vehicle air-conditioning unit 10 is an air conditioning unit that is disposed in a front area of the vehicle compartment such that the conditioning air is blown into the vehicle compartment from an instrument panel.

(4) According to the above-described embodiment, the recessed portion 128a is located in the cool air passage 124 defined in the air conditioning case 12. However, the recessed portion 128a may be located anywhere in the case passage 121.

(5) According to the above-described embodiment, the vehicle air-conditioning unit 10 has the evaporator 16. However, the evaporator 16 may be omitted when the vehicle air-conditioning unit 10 is used in an environment in which there is no necessity to cool the air introduced into the air conditioning case 12.

The present disclosure is not limited to the above-described embodiment and can be modified within the scope of the present disclosure as defined by the appended claims. It is to be understood that elements constituting the above-described embodiment are not necessary and may be omitted as required except for a case of being explicitly mentioned to be necessary and a case of being considered to be absolutely necessary in principle.

Even when a factor such as a quantity of elements, a value, an amount, a range is mentioned in the above-described embodiment, it is to be understood that the factor is not limited to a specific value except for a case of being explicitly mentioned to be necessary and a case of being considered to be absolutely necessary in principle.

Even when a feature such as a material forming a member, a shape of a member, a positional relation of members, it is to be understood that such feature is not limited to a specific material, shape, positional relation, or the like except for a case of being explicitly mentioned to be necessary and a case of being considered to be absolutely necessary in principle.

What is claimed is:

1. A vehicle air-conditioning unit comprising:
an air conditioning case that defines a case passage in which air flows toward a vehicle compartment, the air conditioning case having a recess defining portion that is located in the case passage and defines a recessed portion;
a case interior member that is located in the case passage and has a guide portion and a cover, the guide portion guiding the air flowing in the case passage, the cover being located in the recessed portion; and
a heating heat exchanger heating the air, wherein
the cover prevents the air, flowing in the case passage, from flowing into the recessed portion,
the case passage has
a warm air passage in which the heating heat exchanger is located and
a bypass passage that guides the air to bypass the warm air passage,
the recessed portion is located adjacent to the bypass passage,
the cover covers the recessed portion and prevents the air, flowing in the bypass passage, from flowing into the recessed portion,
the recessed portion extends in a recess longitudinal direction that intersects with a flow direction of the air flowing in the bypass passage, and
the cover extends in the recess longitudinal direction and has an end in the recess longitudinal direction, the end having a position setting portion that sets a position of the case interior member relative to the air conditioning case.

2. The vehicle air-conditioning unit according to claim 1, wherein
the cover is provided integrally with the guide portion.

3. The vehicle air-conditioning unit according to claim 1, wherein
the cover covers the recessed portion and prevents the air, flowing in the case passage, from flowing into the recessed portion.

4. The vehicle air-conditioning unit according to claim 1, wherein
the heating heat exchanger has
a core heating the air flowing in the warm air passage and passing through the core and
a tank that is attached to the core,
the air conditioning case has a tank supporting wall, the tank supporting wall being located around the tank in the air conditioning case and supporting the tank,
the recess defining portion is located to overlap with the tank supporting wall, and
the recessed portion is located on a side of the tank supporting wall opposite to the tank.

5. The vehicle air-conditioning unit according to claim 1, further comprising
a passage door that has a rotary shaft and opens or closes the warm air passage by rotating about the rotary shaft, wherein
the heating heat exchanger has
a core heating the air flowing in the warm air passage and passing through the core and
a tank that is attached to the core,
the air conditioning case therein has
a tank supporting wall that is located around the tank in the air conditioning case and supports the tank and
a rotary shaft surrounding wall that extends from the tank supporting wall and defines a recessed space housing the rotary shaft,
the recess defining portion is located to overlap with the tank supporting wall and the rotary shaft surrounding wall, and
the recessed portion is defined by the tank supporting wall and the rotary shaft surrounding wall and is located on a side of the tank supporting wall opposite to the tank.

6. The vehicle air-conditioning unit according to claim 1, wherein
the cover has a position setting portion that sets a position of the case interior member relative to the air conditioning case.

7. The vehicle air-conditioning unit according to claim 1, wherein
the guide portion and the cover are molded integrally with each other.

8. A vehicle air-conditioning unit comprising:
an air conditioning case that defines a case passage in which air flows toward a vehicle compartment, the air conditioning case having a recess defining portion that is located in the case passage and defines a recessed portion; and
a case interior member that is located in the case passage and has a guide portion and a cover, the guide portion guiding the air flowing in the case passage, the cover being located in the recessed portion, wherein
the cover prevents the air, flowing in the case passage, from flowing into the recessed portion, and
the cover has a position setting portion that sets a position of the case interior member relative to the air conditioning case.

9. The vehicle air-conditioning unit according to claim 8, further comprising:
a heating heat exchanger heating the air, wherein the heating heat exchanger has a core heating the air flowing in a warm air passage, in which the heating heat exchanger is located, and passing through the core and a tank that is attached to the core, the air conditioning case has a tank supporting wall, the tank supporting wall being located around the tank in the air conditioning case and supporting the tank, the recess defining portion is located to overlap with the tank supporting wall, and the recessed portion is located on a side of the tank supporting wall opposite to the tank.

10. The vehicle air-conditioning unit according to claim 8, further comprising:

a heating heat exchanger heating the air; and a passage door that has a rotary shaft and opens or closes a warm air passage, in which the heating heat exchanger is located, by rotating about the rotary shaft, wherein the heating heat exchanger has a core heating the air flowing in the warm air passage and passing through the core and a tank that is attached to the core, the air conditioning case therein has a tank supporting wall that is located around the tank in the air conditioning case and supports the tank and a rotary shaft surrounding wall that extends from the tank supporting wall and defines a recessed space housing the rotary shaft, the recess defining portion is located to overlap with the tank supporting wall and the rotary shaft surrounding wall, and the recessed portion is defined by the tank supporting wall and the rotary shaft surrounding wall and is located on a side of the tank supporting wall opposite to the tank.

* * * * *